United States Patent Office 2,870,145
Patented Jan. 20, 1959

2,870,145

THERAPEUTIC AGENTS

Yvon Gaston Perron, East Syracuse, N. Y., assignor to Bristol Laboratories Inc., Syracuse, N. Y., a corporation of New York No Drawing. Application September 9, 1955
Serial No. 533,507

6 Claims. (Cl. 260—247.2)

This invention relates to amides of tri-alkoxybenzoic acid of therapeutic value, e. g. as non-hypnotic sedatives and clinical tranquillizers, and more particularly to N-substituted-amino-alkylamides of 3,4,5-trialkoxybenzoic acid.

There is provided by the present invention a new class of compounds consisting of the free base and the non-toxic acid addition salts thereof, said free base having the formula

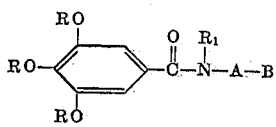

wherein R is lower alkyl; $R_1$ is a member selected from the group consisting of hydrogen, lower alkyl and benzyl; A is a member selected from the group consisting of bivalent, saturated hydrocarbon radicals containing from two to six carbon atoms inclusive and B is a member selected from the group consisting of piperidino, morpholino, 2,6-dimethylmorpholino, N'(lower alkyl)-substituted-piperazino, pyrrolidino, pipecolino, di(lower)alkylamino, dibenzylamino and N-benzyl-N-(lower)alkylamino.

Examples of non-toxic acid addition salts of said free bases with inorganic and organic acids, which may be prepared by the methods hereinafter disclosed, are the hydrochloride, hydrobromide, hydroiodide, sulfate, phosphate, maleate, acetate, citrate, oxalate, succinate, benzoate, tartrate, fumarate, mandelate, malate, ascorbate, 8-chlorotheophyllinate and the like.

The compounds of this invention are useful as pharmaceuticals and as pharmaceutical intermediates. More specifically, compounds of this invention are non-hypnotic sedatives and clinical tranquillizers of use in anxiety states, neuroses, emotional disturbances, insomnia, hypertension and the like. The compounds of the present invention also possess other valuable therapeutic properties as local anesthetics, analgesics and as potentiators of drugs active on the central nervous system.

The compounds of the invention are readily prepared by reacting a 3,4,5-trialkoxybenzoic acid halide, ester or azide with the appropriate aminoalkyl(tertiary)amine. Alternatively the amide of a 3,4,5-trialkoxybenzoic acid is metallated, e. g. with sodium amide or lithium amide, and then reacted with the appropriate tertiary amino-alkyl halide.

The following examples are given to illustrate the scope of this invention without limiting it thereto.

Example 1

To 5.0 g. of 3,4,5-trimethoxybenzoyl chloride dissolved in 50 cc. of chloroform there is added slowly 10 cc. of beta-aminoethyl-morpholine. After standing for 15 to 30 minutes, the solution is washed with cold water and dried over anhydrous sodium sulfate. Removal of the chloroform by distillation leaves about seven grams of the product N-(3,4,5-trimethoxybenzoyl)aminoethylmorpholine, which is also named 4-[2-(3,4,5-trimethoxybenzamido)-ethyl]-morpholine and has the formula

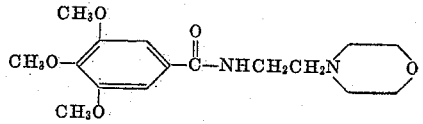

Upon recrystallization from water the colorless, crystalline product melts at about 147°–148° C.

*Analysis.*—Calc'd. for $C_{16}H_{24}O_5N_2$: C, 59.26; H, 7.40.
Found: C, 59.5; H, 7.56.

Example 2

To five grams of 3,4,5-trimethoxybenzoyl chloride dissolved in 50 cc. chloroform there is added slowly 10 cc. of beta-methylaminoethylmorpholine. After standing for at least twenty minutes, the solution was washed with cold water and dried over anhydrous sodium sulfate. Removal of the chloroform by distillation leaves as the residue solid 4[N-(3,4,5-trimethoxybenzoyl)-N-methyl-beta-aminoethyl]morpholine having the formula

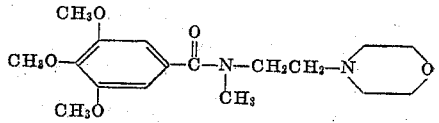

The sulfate of this product is prepared by dissolving this base in one equivalent of sulfuric acid and lyophilizing the resulting solution.

Example 3

Ten ml. of 5-diethylamino-2-aminopentane in 50 ml. of chloroform is added slowly to 5.0 g. of 3,4,5-trimethoxybenzoyl chloride dissolved in 50 ml. chloroform. After standing for 15 to 20 minutes, the solution is cooled, washed with water and dried over anhydrous sodium sulfate. The chloroform is removed by distillation in vacuo and the solid residue of product, N-(3,4,5-trimethoxybenzoyl)-5-diethylamino-2-aminopentane is dried in the air at room temperature. This product may also be called N-(5-diethylamino-2-pentyl)-3,4,5-trimethoxybenzamide and has the formula:

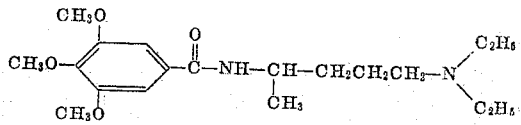

Example 4

To five grams of 3,4,5-trimethoxybenzoyl chloride dissolved in 50 cc. chloroform there is added slowly 12 g. of beta-benzylaminoethylmorpholine dissolved in 50 ml. chloroform. After standing for at least twenty minutes, the solution is washed with cold water and dried over anhydrous sodium sulfate. Removal of the chloroform by distillation leaves as the residue solid 4-[N-(3,4,5-trimethoxybenzoyl) - N - benzyl - beta - aminoethyl]morpholine having the formula

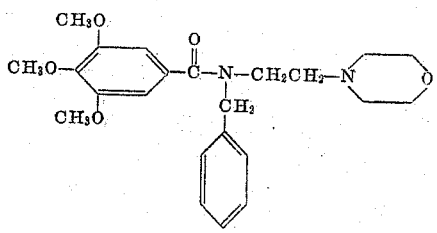

The solid hydrochloride of this product is prepared by dissolving this base in one equivalent of hydrochloric acid and lyophilizing the resulting solution.

Example 5

A solution of ten grams of 3,4,5-trimethoxybenzoyl chloride in 100 cc. chloroform is added slowly to a solution of 20 cc. of 4-(3-amino)propylmorpholine in 100 cc. of chloroform. After standing for at least fifteen minutes, the chloroform solution is washed several times with cold water, to remove the 4-(3-amino)propylmorpholine hydrochloride formed in the reaction and the excess 4-(3-amino)propylmorpholine, and is then dried over anhydrous sodium sulfate. The chloroform is removed by distillation in vacuo to leave the crystalline product N - (3,4,5 - trimethoxybenzoyl) - aminopropylmorpholine, which is also called 4-[3-(3,4,5-trimethoxybenzamido)-propyl]-morpholine and has the formula

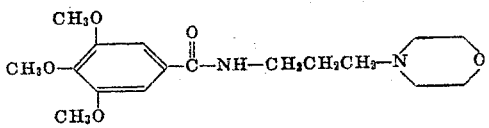

The product is then dissolved in dilute hydrochloric acid, forming N - (3,4,5 - trimethoxybenzoyl) - aminopropylmorpholine hydrochloride. The addition of more than one equivalent of 10% aqueous sodium hydroxide precipitates N - (3,4,5 - trimethoxybenzoyl)aminopropylmorpholine which is recrystallized from water and found to be soluble in boiling water, sparingly soluble in cold water, soluble in dilute hydrochloric acid, soluble in ethanol and insoluble in ether and to melt at about 134°–135° C.

*Analysis.*—Calc'd. for $C_{17}H_{26}O_5N_2$: C, 60.35; H, 7.69. Found: C, 60.5; H, 7.76.

Example 6

To five grams of 3,4,5-trimethoxybenzoyl chloride dissolved in 50 cc. chloroform there is added slowly 10 g. of N-(beta-aminoethyl)-piperidine dissolved in 50 ml. chloroform. After standing for at least fifteen minutes, the solution is washed with cold water and dried over anhydrous sodium sulfate. Removal of the chloroform by distillation leaves as the residue solid N-(3,4,5-trimethoxybenzoyl)aminoethylpiperidine having the formula

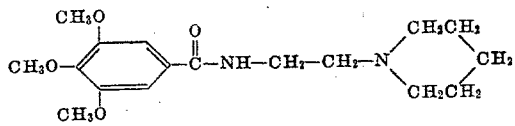

The solid citrate of this product is prepared by dissolving this base in one equivalent of aqueous citric acid and lyophilizing the resulting solution.

Example 7

In separate experiments following the procedure of the above examples, ten grams of 5-(di-n-propylamino)-1-aminopentane, 6-(di-n-hexylamino)-1-ethylaminohexane, beta - 1 - alphapipecolylethylamine, beta - 1 - pyrrolidylethylamine, N - n - butyl - beta - 1 - pyrrolidylethylamine, 1-(4-methylpiperazyl)-4-aminobutane, N-(beta-aminoethyl)-2,6-dimethylmorpholine, di-n-hexylaminoethylamine, and N-benzyl-N-methylaminoethylamine respectively are dissolved in 50 ml. chloroform, added slowly to a solution in 50 ml. chloroform of five grams of 3,4,5-trimethoxybenzoyl chloride and allowed to react for at least fifteen minutes; after washing the solution with water and drying over anhydrous sodium sulfate, the chloroform is removed by distillation to leave as the residue the following solid products respectively:

A. N - (5 - di - n - propylamino - 1 -pentyl) - 3,4,5 - trimethoxybenzamide,
B. N - (ethyl) - N - (6 - di - n - hexylamino - 1 - hexyl)- 3,4,5-trimethoxybenzamide,
C. N - (3,4,5-trimethoxybenzoylaminoethyl) - 2 - methyl-piperidine,
D. N-(3,4,5-trimethylbenzoylaminoethyl)-pyrrolidine,
E. N - n - butyl - N - beta - pyrollidylethyl - 3,4,5 - trimethoxybenzamide,
F. N - 4 - (3,4,5 - trimethoxybenzoylamino) - 1 - butyl-N'-methylpiperazine,
G. N - (3,4,5 - trimethoxybenzoyl)aminoethyl - 2,6 - dimethylmorpholine,
H. N - (beta - di - n - hexylaminoethyl) - 3,4,5 - trimethoxybenzamide and
I. N-benzylmethylaminoethyl-3,4,5-trimethoxybenzamide.

Example 8

The procedures above are followed to produce the corresponding substituted 3,4,5-triethoxybenzamides or 3,4,5-tri-n-hexyloxybenzamides by replacing the 5 grams of 3,4,5-trimethoxybenzoyl chloride with an equal weight of 3,4,5-triethoxybenzoyl chloride or 3,4,5-tri-n-hexyloxybenzoyl chloride respectively. These acid chlorides are produced in the usual manner by the action of thionyl chloride upon the corresponding acids which are prepared in turn in the customary way by alkylation of gallic acid, e. g. with ethyl bromide in the presence of sodium hydroxide followed, if necessary, by saponification to the acid of any ester formed.

I claim:

1. A member selected from the group consisting of a free base and the non-toxic acid addition salts thereof, said free base having the formula

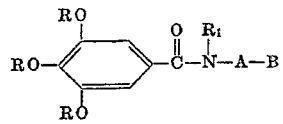

wherein R is lower alkyl; $R_1$ is a member selected from the group consisting of hydrogen, lower alkyl and benzyl; A is a member selected from the group consisting of bivalent, saturated, acyclic hydrocarbon radicals containing from two to six carbon atoms inclusive and B is a member selected from the group consisting of piperidino, morpholino, 2,6-dimethyl-morpholino, N'-(lower alkyl)-substituted-piperazino, pyrrolidino, pipecolino, di-(lower)alkyl-amino, dibenzylamino and N-benzyl-N-(lower)alkylamino.

2. N-(3,4,5-trimethoxybenzoyl)aminoethylmorpholine.
3. 4-N-(3,4,5-trimethoxybenzoyl )- N - methyl - beta-aminoethyl morpholine.
4. N-(3,4,5-trimethoxybenzoyl) - 5 - diethylamino - 2-aminopentane.
5. 4- N-(3,4,5-trimethoxybenzoyl) - N - benzyl - beta-aminoethyl morpholine.
6. N-(3,4,5 - trimethoxybenzoyl)aminopropylmorpholine.

References Cited in the file of this patent

UNITED STATES PATENTS 1,936,496  Guggenheim _____ Dec. 12, 1933

FOREIGN PATENTS 822,386  Germany _____ Nov. 26, 1951